US008942122B2

United States Patent
He et al.

(10) Patent No.: US 8,942,122 B2
(45) Date of Patent: Jan. 27, 2015

(54) AUTOMATIC UPLINK-DOWNLINK RATIO RECONFIGURATION SETTING IN WIRELESS COMMUNICATION SYSTEM

(75) Inventors: Hong He, Beijing (CN); Jong-Kae Fwu, Sunnyvale, CA (US); Rui Huang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/526,767

(22) Filed: Jun. 19, 2012

(65) Prior Publication Data

US 2013/0188500 A1      Jul. 25, 2013

Related U.S. Application Data

(60) Provisional application No. 61/589,774, filed on Jan. 23, 2012.

(51) Int. Cl.
*H04W 72/04*    (2009.01)
*H04W 24/00*    (2009.01)

(52) U.S. Cl.
USPC ........................................................ 370/252

(58) Field of Classification Search
CPC .......... H04W 84/045; H04W 36/0083; H04W 72/04; H04W 24/00; H04W 56/00
USPC .................. 370/311, 335, 331, 332, 252, 280
See application file for complete search history.

(56) References Cited

U.S. PATENT DOCUMENTS

2004/0166900 A1    8/2004    Qiu et al.
2006/0209767 A1 *  9/2006    Chae et al. .................... 370/335
2008/0130580 A1 *  6/2008    Chaponniere et al. ........ 370/331
2010/0062779 A1 *  3/2010    Bienas et al. ................. 455/446

(Continued)

FOREIGN PATENT DOCUMENTS

EP          1895795 A2      3/2008
WO       2013112407 A1      8/2013

OTHER PUBLICATIONS

International Search Report and Written Opinion received for PCT Patent Application No. PCT/US2013/022413 mailed on May 10, 2013, 12 Pages.

(Continued)

*Primary Examiner* — Charles C Jiang
*Assistant Examiner* — Will Lin
(74) *Attorney, Agent, or Firm* — Cool Patent, P.C.

(57)    ABSTRACT

At least one neighbor cell is identified by a base station by detecting a synchronization signal of the at least one neighbor cell. A received signal power, such as a Reference Signal Received Power (RSRP) or a Reference Signal Received Quality (RSRQ), or a combination thereof, is also measured from the at least one neighbor cell. Identifying information and the received signal power of the at least one neighbor cell is then communicated to a network entity of the wireless network. Information is received from the network entity indicating whether the base station can enable a reconfiguration of the allocation of uplink and downlink subframes used in the cell of the base station. Based on the information received from the network entity, the base station enables a reconfiguration of the allocation of uplink and downlink subframes used in the cell.

25 Claims, 11 Drawing Sheets

(56) References Cited

U.S. PATENT DOCUMENTS

| | | |
|---|---|---|
| 2011/0116410 A1* | 5/2011 | Sung et al. .................... 370/252 |
| 2011/0218002 A1 | 9/2011 | Hong et al. |
| 2011/0305159 A1 | 12/2011 | Hofmann et al. |
| 2012/0113875 A1* | 5/2012 | Alanara et al. ................ 370/280 |
| 2012/0113961 A1* | 5/2012 | Krishnamurthy ............. 370/332 |
| 2012/0182965 A1* | 7/2012 | Das et al. ...................... 370/331 |
| 2012/0268414 A1* | 10/2012 | Alameh et al. ................ 345/174 |

OTHER PUBLICATIONS

International Preliminary Report on Patentability and Written Opinion received for PCT Patent Application No. PCT/US2013/022413, mailed on Aug. 7, 2014, 9 pages.

* cited by examiner

AUTOMATIC UPLINK-DOWNLINK RATIO RECONFIGURATION SETTING IN WIRELESS COMMUNICATION SYSTEM

CROSS-REFERENCE TO RELATED APPLICATION

The present patent application is related to and claims priority to U.S. Provisional Patent Application Ser. No. 61/589,774, filed Jan. 23, 2012.

TECHNICAL FIELD

Embodiments described herein are generally directed to the field of wireless communications.

BACKGROUND ART

Tight time synchronization is used for a conventional Time Division Duplex (TDD) network deployment, and the same TDD Uplink-Downlink (TDD UL-DL) configuration is used in different cells of a TDD network to mitigate inter-cell interference. In a certain version of the 3GPP LTE System, UL and DL subframe allocation within a radio frame can be reconfigured within a TDD network using system information broadcast signaling. While the UL-DL subframe allocation is expected to be semi-static after configured, that is, varied only occasionally, the UL-DL subframe allocation configuration, whether fixed or semi-statically configured, may not be optimum for an instantaneous traffic situation, thereby resulting in an inefficient utilization of resources, particularly for cells having a small number of users.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
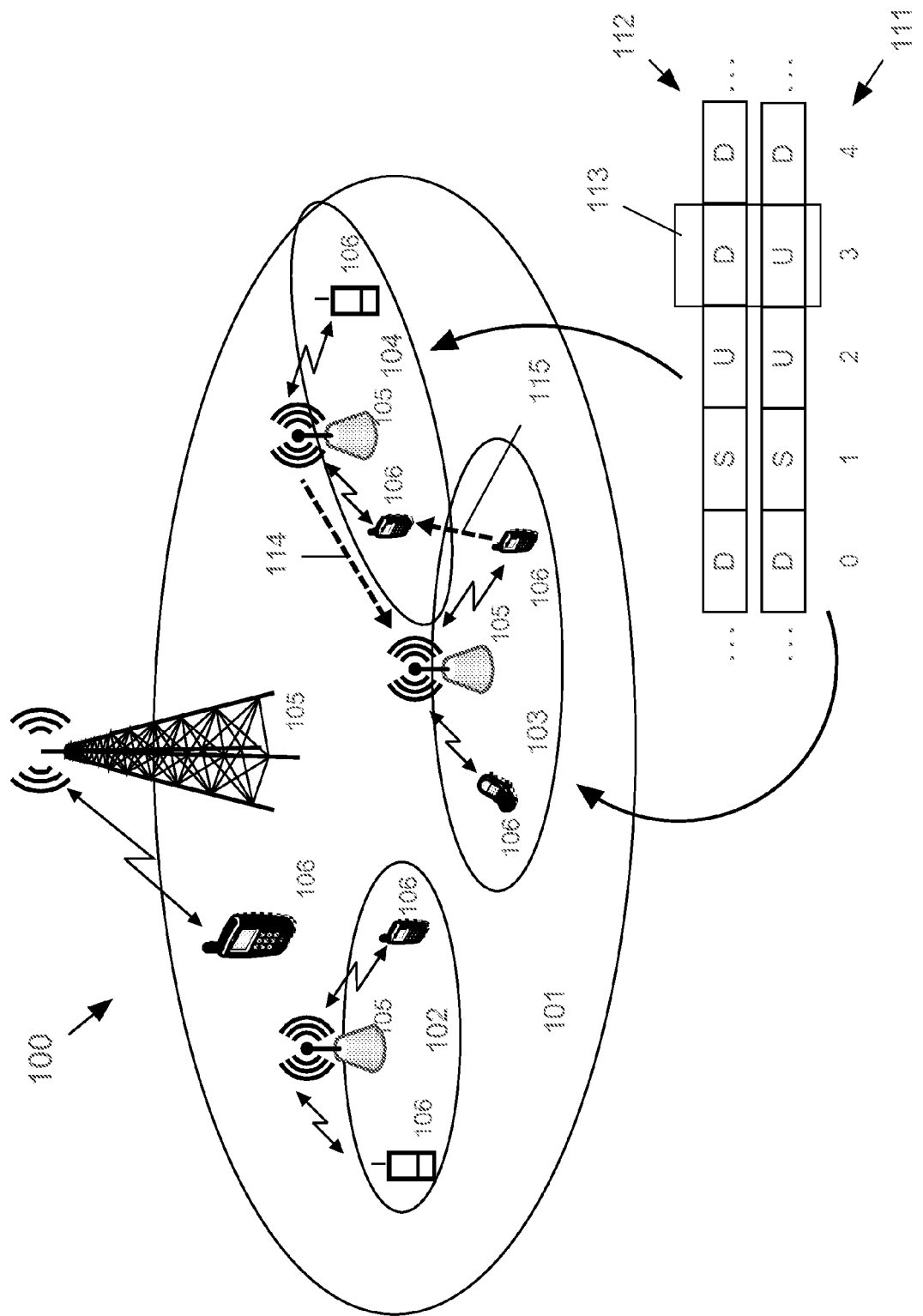
FIG. 1 depicts an exemplary heterogeneous Long Term Evolution TDD (LTE-TDD) network deployment.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of techniques described herein relate to an apparatus, a system and a method for determining whether a cell is an isolated cell and for managing co-channel interference if dynamic UL-DL reconfiguration is enabled in an LTE-TDD-based network. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein provides a technique for determining whether a cell is an isolated cell and for managing co-channel interference if dynamic UL-DL reconfiguration is enabled in an LTE-TDD-based network. According to the subject matter disclosed herein, an enhanced Node B (eNB/BS) could properly enable or disable UL-DL subframe reallocation functionality based on whether the cell is an isolated cell.

FIG. 1 depicts an exemplary heterogeneous Long Term Evolution TDD (LTE-TDD) network deployment 100 comprising a macro cell 101, an isolated Low Power Node (LPN) cell 102, and two non-isolated LPN cells 103 and 104. LPN cells 102-104 are located within macro cell 101. Cells 101-104 each have a base station (BS) 105, which could be embodied as a base station (BS) or an enhanced Node B (eNB or eNodeB). Wireless devices 106, which could be embodied as a mobile station (MS), a subscriber station (SS), user equipment (UE), and/or a machine-to-machine-type (M2M-type) device. While only LPN cells 102-104 are shown deployed within macro cell 101, it should be understood that any number of LPN cells could be deployed within macro cell 101. Additionally, it should be understood that there could be more wireless devices 106 deployed throughout macro cell 101 and LPN cells 102-104.

LPN cell 102 is an isolated cell because cell 102 does not experience and/or generate neighboring-cell co-channel interference. That is, because LPN cell 102 is isolated from other LPN cells, adaptively changing the UL-DL subframe allocation in cell 102 by LPN cell 102 does not generate additional co-channel interference into neighboring cells. Accordingly, LPN cell 102 can adaptively change the UL-DL subframe allocation by taking into account asymmetry in UL and DL traffic within cell 102 in order to optimize spectral efficiency.

For neighboring cells in a multi-cell LTE-TDD network deployment, such as LPN cells 103 and 104, if there is no coordination with neighboring cells, adaptively changing UL-DL subframe allocation to optimize spectral efficiency in response to an instantaneous traffic situation can cause a conflicting UL-DL subframe allocation with a neighboring cell (i.e., subframes having simultaneously different transmission directions in neighboring cells).

For example, consider the situation in which LPN cell 103 has the TDD UL-DL subframe sequence represented at 111, and LPN cell 104 has the TDD UL-DL subframe sequence represented at 112. If either LPN cell 103 or LPN cell 104 adaptively changes the UL-DL subframe allocation without coordinating with the other cell, there may be a situation in which subframes have simultaneously different transmission directions, such as that indicated at 113. In particular, subframe 3 of the TDD UL-DL subframe sequence for LPN cell 103 is an UL subframe, whereas subframe 3 of the TDD UL-DL subframe sequence for LPN cell 104 is a DL subframe.

The conflicting UL-DL subframe allocation causes two types of co-channel interference in neighboring cells during the conflicting subframes. The first type of interference, referred to herein as Type 1 co-channel interference, is LPN-to-LPN co-channel interference and is represented at 114 in FIG. 1. The second type of interference, referred to herein as Type 2 co-channel interference is UE-to-UE co-channel interference and is represented at 115. The two additional types of co-channel interference could degrade overall system performance and, depending on the amount of interference, could cause system failure. Thus, before dynamic UL-DL subframe reconfiguration by an LPN cell can be effectively utilized, a technique is needed for determining whether an LPN cell is an isolated cell.

Figure 2:
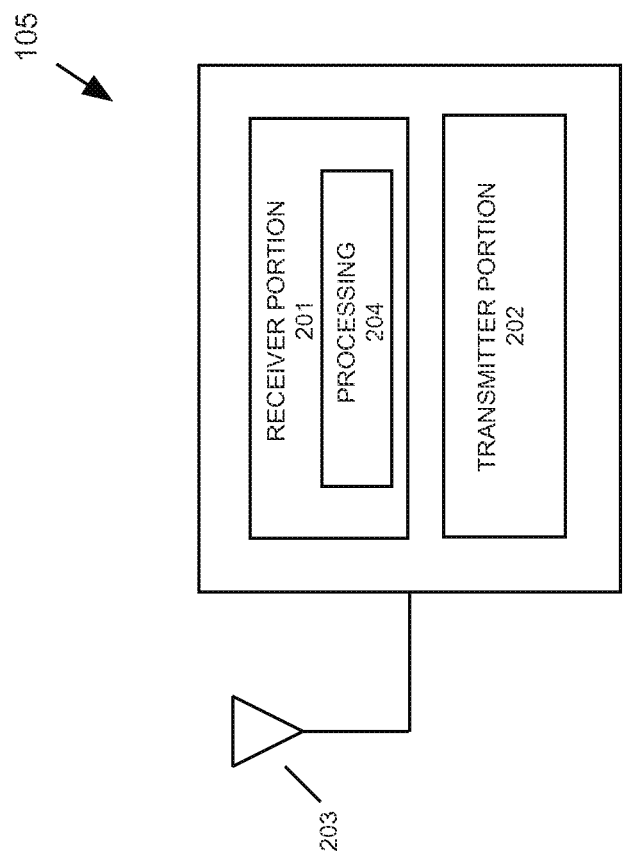
FIG. 2 depicts an exemplary embodiment of a functional block diagram of a base station 105 according to the subject matter disclosed herein.

FIG. 2 depicts an exemplary embodiment of a functional block diagram of a base station 105 according to the subject matter disclosed herein. Base station 105 comprises an enhanced node B (eNB), such as eNB 710 in FIG. 7, or base station 614 and/or 620 in FIG. 6, and can be located in a macrocell, a picocell or a femtocell in a wireless network that comprises one of an IEEE-802.1.1-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

Base station 105 further comprises a receiver portion 201 and a transmitter portion 202 that are interconnected in a well-known manner. Both receiver portion 201 and transmitter portion 202 are connected to antenna 203 in a well-known manner. Receiver portion 202 comprises processing 204 that is capable of identifying from received signals neighbor cells in the wireless network in which base station 105 is located. In one exemplary embodiment, processing 204 is capable of identifying a neighbor cells by detecting a synchronization signal of the each neighbor cell and is capable of measuring a received signal power from each neighbor cell. In one exemplary embodiment, a neighbor cell is identified by detecting time and frequency synchronization signals of the neighbor cell. In another exemplary embodiment, receiver portion 201 measures the received signal power by measuring a Reference Signal Received Power (RSRP) or a Reference Signal Received Quality (RSRQ), or a combination thereof, of a neighbor cell. Transmitter portion 202 is capable of wirelessly communicating to a network entity of the wireless network identifying information and the received signal power of the at least one neighbor cell. In one exemplary embodiment, base station 105 is capable of communicating to the network entity of the wireless network the identifying information and the received signal power of the at least one neighbor cell via a wired connection. In one exemplary embodiment, receiver portion 201 is further capable of receiving from the network entity information, via a wireless or a wired connection, indicating whether a reconfiguration can be enabled of the allocation of uplink and downlink subframes used in the cell in which base station 105 is located. The information received from the network entity indicates the reconfiguration can be enabled of the allocation of uplink and downlink subframes used in the cell. In response to the received information, processing 204 reconfigures the allocation of uplink and downlink subframes used in the cell. In one exemplary embodiment, base station 105 includes a touchscreen display that is capable of displaying information related to the received signal power from a neighbor cell, and is capable of being controlled by a stylus, at least one finger, or a combination thereof.

Figure 3:
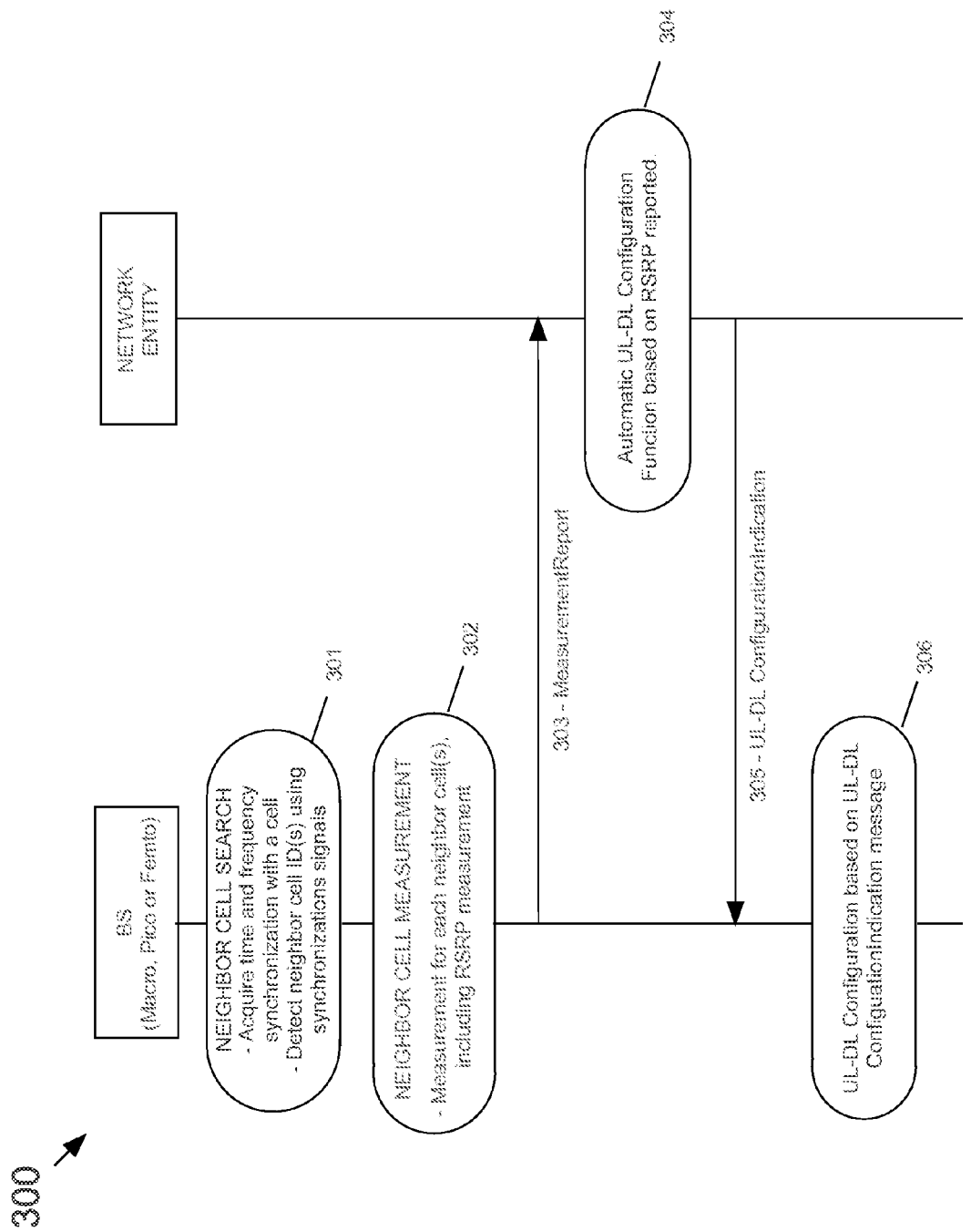
FIG. 3 depicts a process flow for identifying whether a cell is an isolated cell and for dynamic UL-DL subframe allocation according to the subject matter disclosed herein.

FIG. 3 depicts a process flow 300 for identifying whether a cell is an isolated cell and for dynamic UL-DL subframe allocation according to the subject matter disclosed herein. At 301, in one exemplary embodiment, if instantaneous traffic conditions are not optimum in a cell, a base station (BS) of a cell performs a neighbor-cell search process. In another exemplary embodiment, the BS performs a neighbor-cell search process as part of a regular system function. The BS, which could be an eNB in a Macro cell, a PicoCell or a FemtoCell, detects time and frequency synchronization with neighbor cell(s) and detects each neighboring Cell ID(s) using synchronization signals previously received during power-up of the BS.

Figure 4:
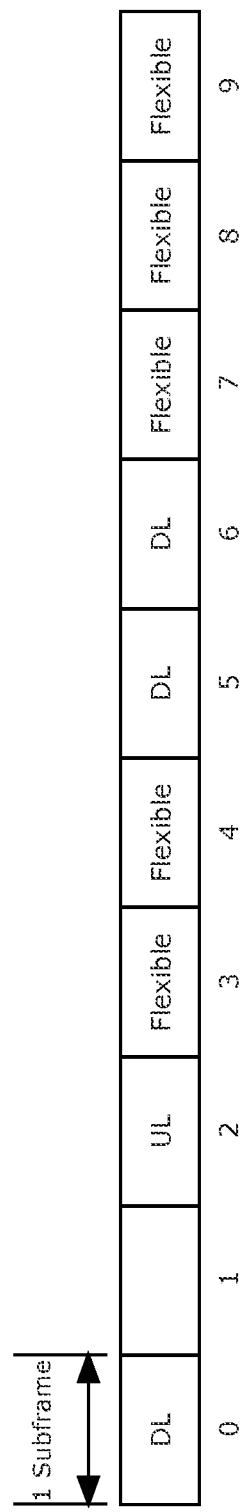
FIG. 4 depicts a portion of a flexible frame structure type 2 for a TD-LTE system.

At 302, the BS performs a neighbor-cell measurement process. In one exemplary embodiment, the BS is capable of performing measurements and measurement reporting to support the dynamic UL-DL subframe reallocation functionality. For example, the BS measures the Reference Signal Received Power (RSRP) and/or Reference Signal Received Quality (RSRQ) measurement for each corresponding neighboring cell detected at 301. In one exemplary embodiment, the measured RSRP and RSRQ values are defined in 3GPP TS 36.214 specification. In one exemplary embodiment, the subframes that BS uses for the RSRP and/or RSRQ measurements are the dedicated downlink subframes in each radio frame, thereby providing reliably accurate measurement results. FIG. 4 depicts a portion of a flexible frame structure type 2 for a TD-LTE system. The BS uses subframes 0, 1, 5 and 6, which are dedicated downlink subframes, for measuring RSRP and RSRQ values. Subframe 2 is a dedicated uplink subframe, and subframes 3, 4 and 7-9 can be flexibly configured to be uplink or downlink subframes.

At 303 in FIG. 3, the measurements made at 302 are reported from the BS to a Network Entity (NE) using a MeasurementReport message using a well-known communication protocol technique. In one exemplary embodiment the NE could be an OAM (Operations And Management) system in E-UTRAN. In one exemplary embodiment, the measurement report message includes PCI (Physical Cell Identity), RSRP value and/or RSRQ value for each neighboring cell. Table 1 shows exemplary information that is communicated to the NE in a measurement report message.

TABLE 1

Exemplary Information in Measurement Report Message

| Index | NeighCellList | RSRP Value | RSRQ Value |
|---|---|---|---|
| 0 | physCellId$_0$ | RSRP$_0$ | RSRQ$_0$ |
| 1 | physCellId$_1$ | RSRP$_1$ | RSRQ$_1$ |
| 2 | ... | ... | ... |

In another exemplary embodiment, the BS transfers the measurement results during other communication procedures predefined between NE and BS so that the NE has sufficient information from measurements reported from the BS and from neighboring cells.

Figure 5:
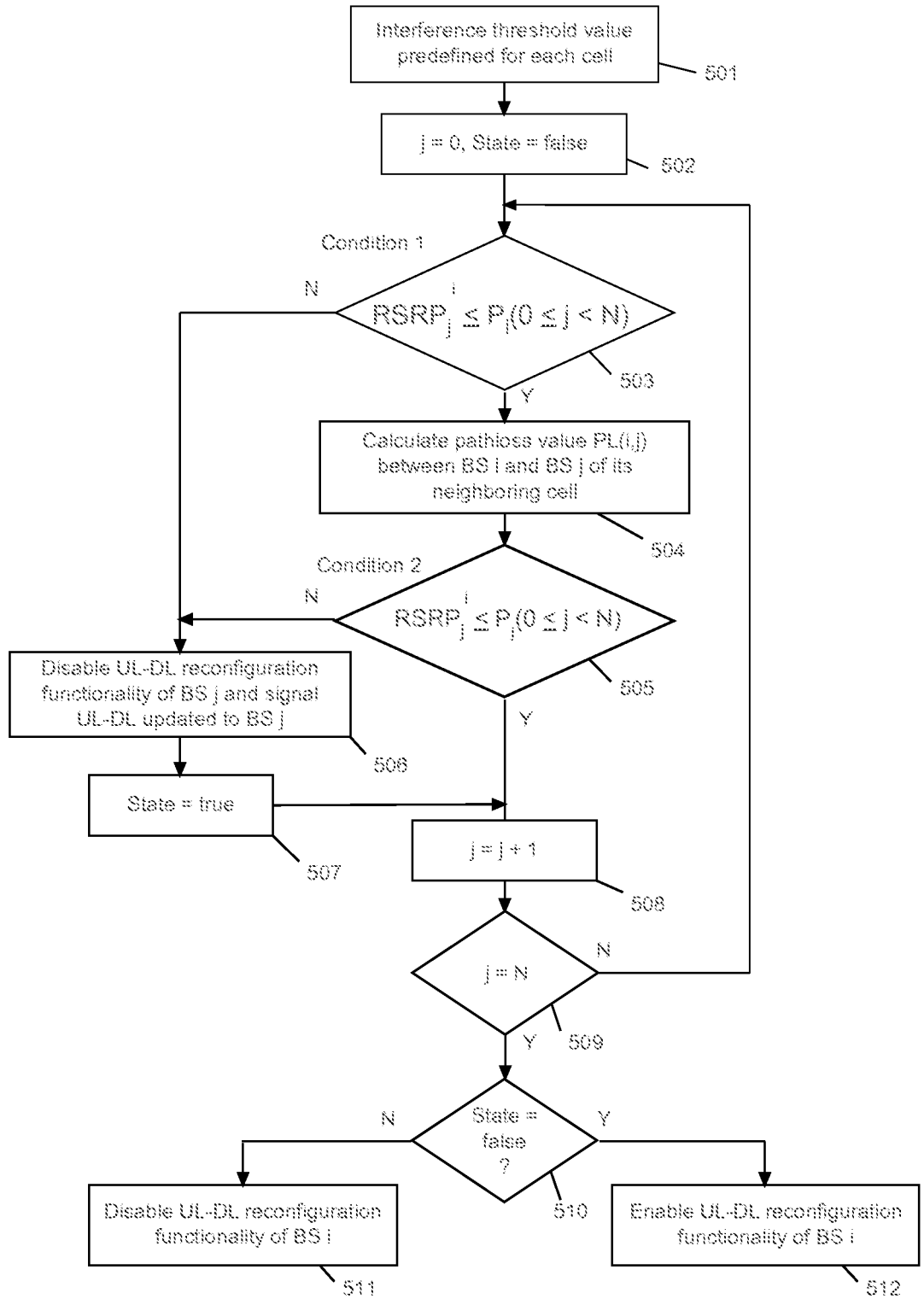
FIG. 5 depicts one exemplary embodiment of the process used at the NE for determining Isolated Cell Identification and for Automatic UL-DL reconfiguration of a base station according to the subject matter disclosed herein.

At 304, when the NE receives the measurement results reported from BS side, the NE is automatically determines whether UL-DL reconfiguration functionality can be provided at the BS. FIG. 5 depicts one exemplary embodiment of the process 500 used at the NE for determining Isolated Cell Identification and for Automatic UL-DL reconfiguration of a base station according to the subject matter disclosed herein. Let $P_i$ denote the interference threshold value for the i-th base station BS i. $P_i$ is used for assisting BS i to identify isolated cells. At block 501, a predetermined interference threshold value $P_i$ is used for BS i and is stored by the NE. Threshold value $P_i$ is related to the interference level at BS i and can be obtained through simulation evaluation and/or be based on experimental results collected from an actual network deployment. For each BS i, $RSPR_i^j$ denotes the Reference Signal Received Power from a specified neighboring cell j. At block 502, index j is set equal to 0, and State is set to false.

For each neighboring cell j, as illustrated by block 503 to block 505, the NE respectively compares the $RSPR_i^j$ ($0 \le j < N$) value reported from BS i (condition 1) and $RSPR_j^i$ ($0 \le j < N$) calculated by the NE (condition 2) to the interference threshold value $P_i$ and $P_j$. If both condition 1 ($RSPR_i^{ji}$ ($0 \le P_i$)) and condition 2 ($RSPR_j^i$ ($0 \le P_i$)) are valid for all the neighboring cells detected by BS i, the UL-DL reconfiguration functionality will be enabled at BS i (block 512) and no changes will be needed for neighboring cells detected by BS i. Otherwise, for each neighboring cell j, if either Condition 1 $RSPR_i^{ji}$ ($0 \le P_i$) or Condition 2 $RSPR_j^i$ ($0 \le P_i$) is invalid (State=true), the NE simultaneously disables the UL-DL reconfiguration functionality of neighboring cell j (block 506) and the UL-DL reconfiguration functionality at BS i (block 511). It should be noted that the value $RSPR_j^i$ could be reported by BS of neighboring cell j or calculated by the NE itself based on the path loss value obtained at block 504 in which PL(i,j) comprises the pathloss between BS i and BS j. It should be understood that the basic assumption of symmetric pathloss between BS i and BS j is utilized for the above calculation and design. In an alternative exemplary embodiment, asymmetric pathloss between BS i and BS j could be taken into account.

Returning to block 304 in FIG. 3, the NE determines the UL-DL configuration Indication status (FIG. 5) and at 305 sends an UL-DL ConfigurationIndication message to BS i to inform BS i that UL-DL reconfiguration functionality has been enabled or disabled. The NE also sends a Configuration-Indication message to neighboring cells of BS i if their UL-DL configuration indication is changed from a previous state based on the output of the Isolated Cell Identification and Automatic UL-DL configuration determination (FIG. 5). At 306, the BS internally sets the UL-DL reconfiguration enable or disable decision in response to the UL-DL Configuration-Indication message received from NE.

Figure 6:
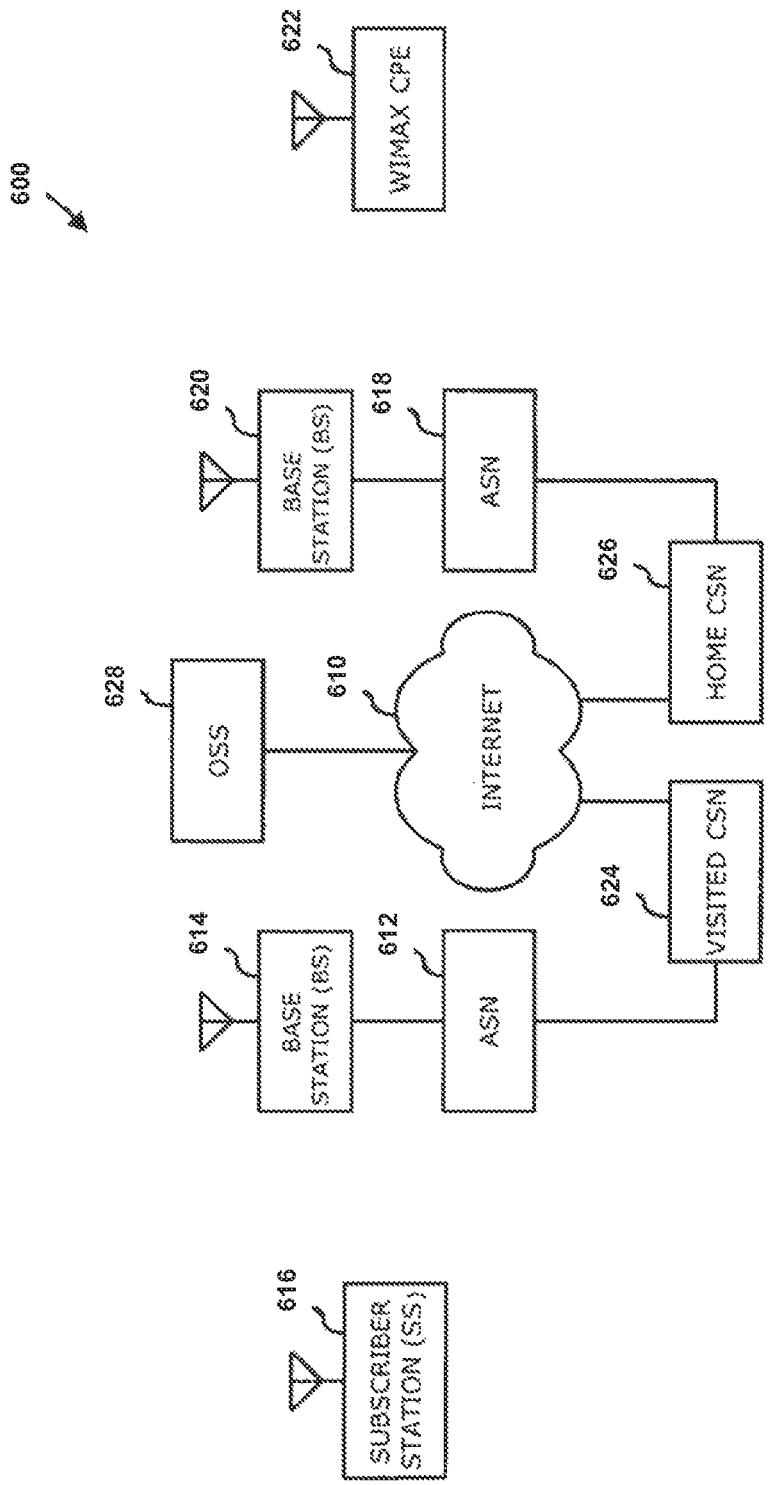
FIG. 6 depicts a block diagram of an exemplary configuration of a wireless network in accordance with one or more exemplary embodiments disclosed herein.

FIG. 6 depicts a block diagram of an exemplary configuration of a wireless network 600 in accordance with one or more exemplary embodiments disclosed herein. One or more of the elements of wireless network 600 may utilize a technique for determining whether a cell is an isolated cell and for managing co-channel interference if dynamic UL-DL reconfiguration is enabled in an LTE-TDD-based network. As shown in FIG. 6, network 600 may be an Internet-Protocol-type (IP-type) network comprising an Internet-type network 610, or the like, that is capable of supporting mobile wireless access and/or fixed wireless access to Internet 610. In one or more exemplary embodiments, network 600 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11 a/b/g/h standard), and so on. In one or more alternative exemplary embodiments, network 600 may be in compliance with a Third Generation Partnership Project Long Term Evolution (3GPP LTE) or a 3GPP2 Air Interface Evolution (3GPP2 ATE) standard. In general, network 600 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4fi Generation (4G) type network, and so on, and the scope of the claimed subject matter is not limited in these respects. As an example of mobile wireless access, access service network (ASN) 612 is capable of coupling with base station (BS) 614 to provide wireless communication between subscriber station (SS) 616 and Internet 610. Subscriber station 616 may comprise a mobile-type device or information-handling system capable of wirelessly communicating via network 600, for example, a notebook-type computer, a cellular telephone, a personal digital assistant, an M2M-type device, or the like. ASN 612 may implement profiles that are capable of defining the mapping of network functions to one or more physical entities on network 500. Base station 614 may comprise radio equipment to provide radio-frequency (RF) communication with subscriber station 616, and may comprise, for example, the physical layer (PHY) and media access control (MAC) layer equipment in compliance with an IEEE 802.16e-type standard. Base station 614 may further comprise an IP backplane to couple to internet 610 via ASN 612, although the scope of the claimed subject matter is not limited in these respects.

Network 600 may further comprise a visited connectivity service network (CSN) 624 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 626, and the scope of the claimed subject matter is not limited in these respects. Visited CSN 624 may be referred to as a visited CSN in the case, for example, in which visited CSN 624 is not part of the regular service provider of subscriber station 616, for example, in which subscriber station 616 is roaming away from its home CSN, such as home CSN 626, or, for example, in which network 600 is part of the regular service provider of subscriber station, but in which network 600 may be in another location or state that is not the main or home location of subscriber station 616. In a fixed wireless arrangement, WiMAX-type customer premises equipment (CPE) 622 may be located in a home or business to provide home or business customer broadband access to Internet 610 via base station 620, ASN 618, and home CSN 626 in a manner similar to access by subscriber station 616 via base station 614, ASN 612, and visited CSN 624, a difference being that WiMAX CPE 622 is generally disposed in a stationary location, although it may be moved to different locations as needed, whereas subscriber station may be utilized at one or more locations if subscriber station 616 is within range of base station 614 for example. It should be noted that CPE 622 need not necessarily comprise a WiMAX-type terminal, and may comprise other types of terminals or devices compliant with one or more standards or protocols, for example, as discussed herein, and in general may comprise a fixed or a mobile device. In accordance with one or more embodiments, operation support system (OSS) 628 may be part of network 600 to provide management functions for network 600 and to provide interfaces between functional entities of network 600. Network 600 of FIG. 6 is merely one type of wireless network showing a certain number of the components of network 600; however, the scope of the claimed subject matter is not limited in these respects.

In one exemplary embodiment, base station 614 and/or base station 620 could be a base station for a base station for macrocell, a picocell or a femtocell. In another exemplary embodiment, base station 614 and/or base station 620 could be configured to have functional capabilities corresponding to the functional capabilities of base station 105 in FIGS. 1 and 2.

Figure 7:
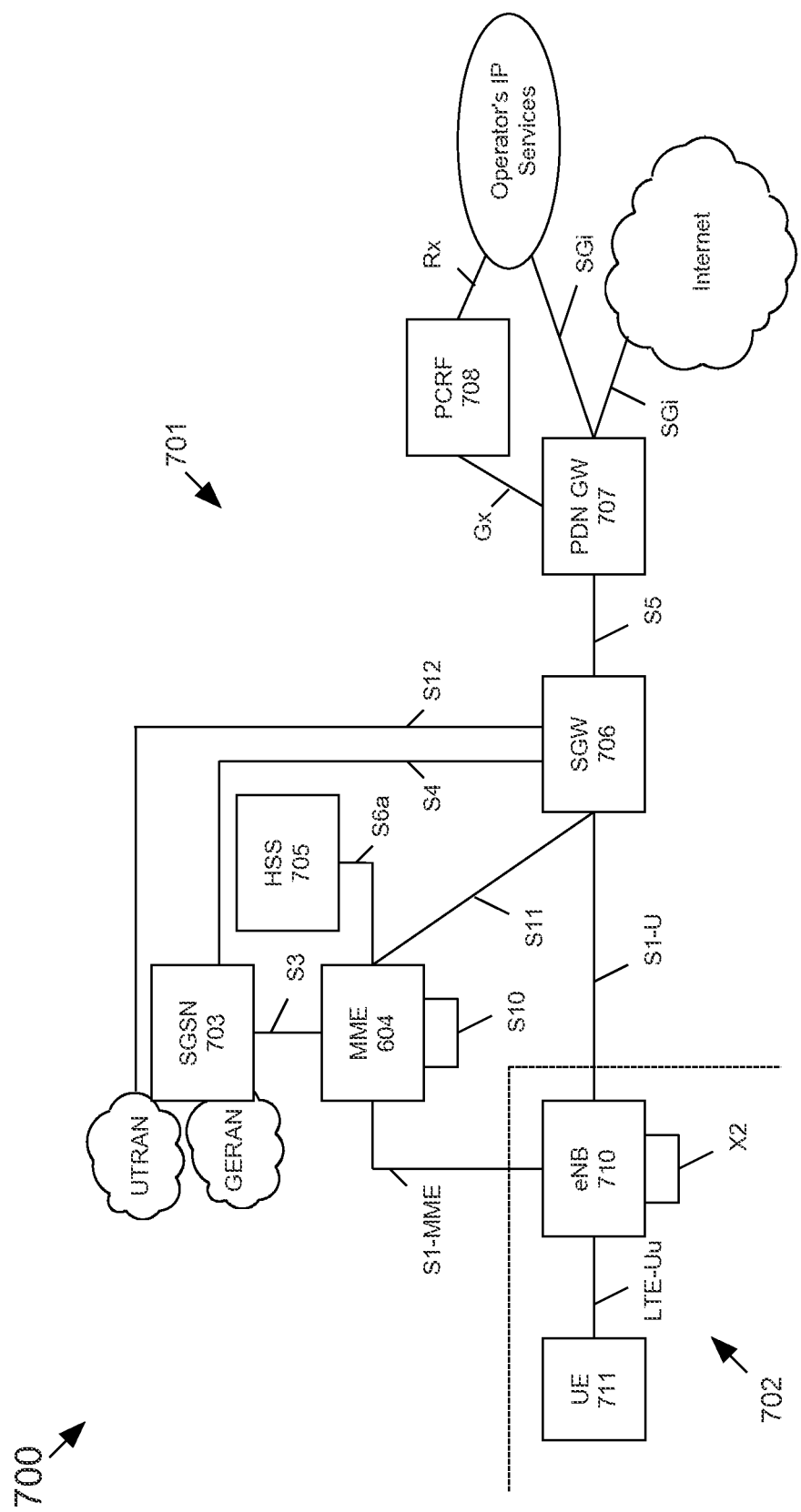
FIG. 7 shows an exemplary block diagram of the overall architecture of a 3GPP LTE network that utilizes a technique for determining whether a cell is an isolated cell and for managing co-channel interference if dynamic UL-DL reconfiguration is enabled in an LTE-TDD-based network according to the subject matter disclosed herein.

FIG. 7 shows an exemplary block diagram of the overall architecture of a 3GPP LTE network 700 that utilizes a technique for determining whether a cell is an isolated cell and for managing co-channel interference if dynamic UL-DL reconfiguration is enabled in an LTE-TDD-based network according to the subject matter disclosed herein. FIG. 7 also generally shows exemplary network elements and exemplary standardized interfaces. At a high level, network 700 comprises a core network (CN) 701 (also referred to as an evolved Packet System (EPC)), and an air-interface access network E-UTRAN 702. CN 701 is responsible for the overall control of the various User Equipment (UE) connected to the network and establishment of the bearers. CN 701 may include functional entities, such as a home agent HA and/or an ANDSF server or entity, although not explicitly depicted. E-UTRAN 702 is responsible for all radio-related functions.

The main exemplary logical nodes of CN 701 include, but are not limited to, a Serving GPRS Support Node 703, the Mobility Management Entity 704, a Home Subscriber Server (HSS) 705, a Serving Gate (SGW) 706, a PDN Gateway 707 and a Policy and Charging Rules Function (PCRF) Manager 708. The functionality of each of the network elements of CN 701 is well known and is not described herein. Each of the network elements of CN 701 are interconnected by well-known exemplary standardized interfaces, some of which are indicated in FIG. 7, such as interfaces S3, S4, S5, etc., although not described herein.

While CN 701 includes many logical nodes, the E-UTRAN access network 702 is formed by one node, the evolved NodeB (base station (BS), eNB or eNodeB) 710, which connects to one or more User Equipment (UE) 711, of which only one is depicted in FIG. 7. UE 711 is also referred to herein as a wireless device (WD) and/or a subscriber station (SS), and can include an M2M-type device. In one exemplary configuration, a single cell of an E-UTRAN access network 702 provides one substantially localized geographical transmission point (having multiple antenna devices) that provides access to one or more UEs. In another exemplary configuration, a single cell of an E-UTRAN access network 702 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 704 by an S1-MME interface and to SGW 706 by an S1-U interface. The protocols that run between the eNBs and the UEs are generally referred to as the "AS protocols." Details of the various interfaces are well known and not described herein.

The eNB 710 hosts the PHYsical (PHY), Medium Access Control (MAC), Radio Link Control (RLC), and Packet Data Control Protocol (PDCP) layers, which are not shown in FIG. 7, and which include the functionality of user-plane header-compression and encryption. The eNB 710 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 710 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 711, generates pages for UEs 711 over the air, broadcasts system information, controls UE measurement reporting, such as the periodicity of Channel Quality Information (CQI) reports, and allocates cell-level temporary identifiers to active UEs 711. The RRC layer also executes transfer of UE context from a source eNB to a target eNB during handover, and provides integrity protection for RRC messages. Additionally, the RRC layer is responsible for the setting up and maintenance of radio bearers.

In one exemplary embodiment, eNB 710 could be located in a macrocell, a picocell or a femtocell. In another exemplary embodiment, eNB 710 could be configured to have functional capabilities corresponding to the functional capabilities of base station 105 in FIGS. 1 and 2.

Figure 8:
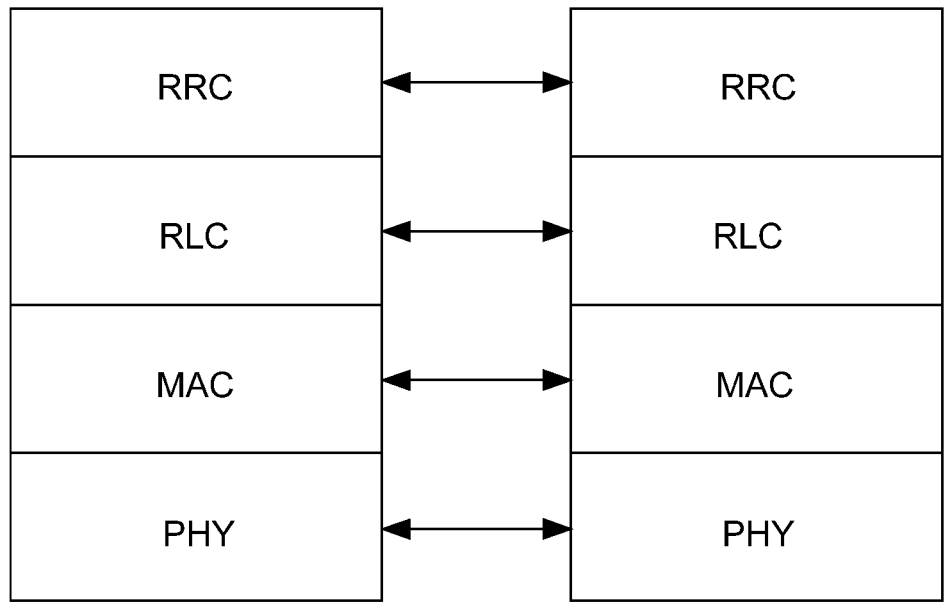
FIGS. 8 and 9 respectively depict exemplary radio interface protocol structures between a UE and an eNodeB that are based on a 3GPP-type radio access network standard and that utilize a technique for determining whether a cell is an isolated cell and for managing co-channel interference if dynamic UL-DL reconfiguration is enabled in an LTE-TDD-based network according to the subject matter disclosed herein.
Figure 9:
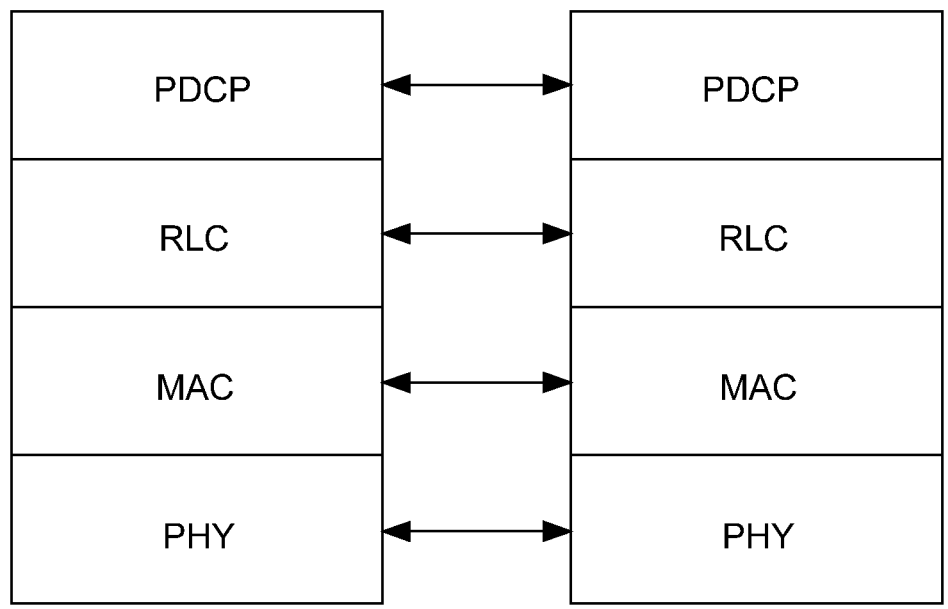

FIGS. 8 and 9 respectively depict exemplary radio interface protocol structures between a UE and an eNodeB that are based on a 3GPP-type radio access network standard and that utilize a technique for determining whether a cell is an isolated cell and for managing co-channel interference if dynamic UL-DL reconfiguration is enabled in an LTE-TDD-based network according to the subject matter disclosed herein. More specifically, FIG. 8 depicts individual layers of a radio protocol control plane and FIG. 9 depicts individual layers of a radio protocol user plane. The protocol layers of FIGS. 8 and 9 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 10:
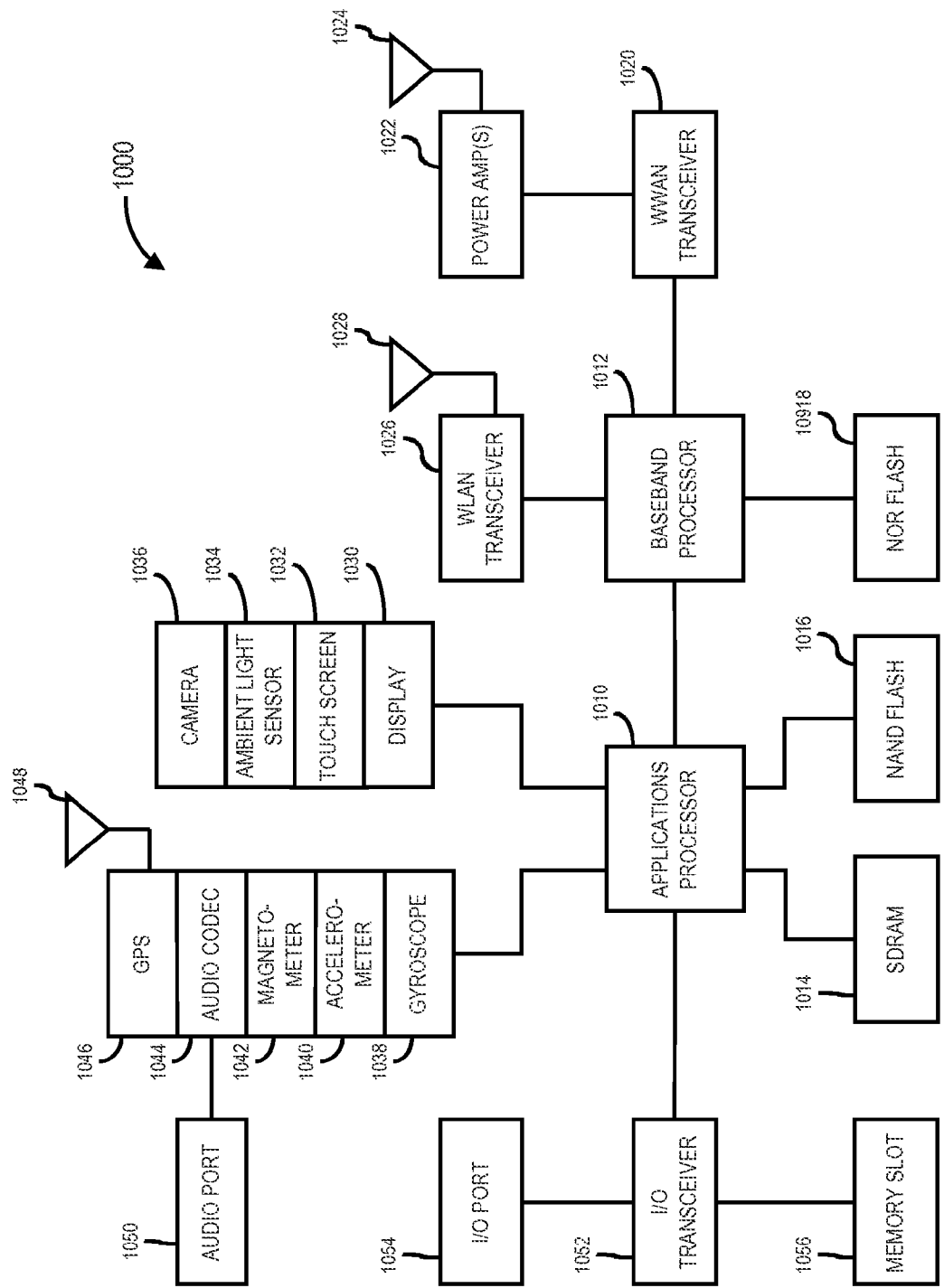
FIG. 10 depicts an exemplary functional block diagram of an information-handling system that utilizes a technique for determining whether a cell is an isolated cell and for managing co-channel interference if dynamic UL-DL reconfiguration is enabled in an LTE-TDD-based network according to the subject matter disclosed herein.

FIG. 10 depicts an exemplary functional block diagram of an information-handling system 1000 that utilizes a technique for determining whether a cell is an isolated cell and for managing co-channel interference if dynamic UL-DL reconfiguration is enabled in an LTE-TDD-based network according to the subject matter disclosed herein. Information-handling system 1000 of FIG. 10 may tangibly embody one or more of any of the exemplary network elements and/or functional entities of the network as shown in and described with respect to FIG. 6, and/or core network 701 as shown in and described with respect to FIG. 7. For example, information-handling system 1000 may represent the components of an M2M-type device as embodied by subscriber station 616, CPE 622, base station 105, base stations 614 and 620, eNB 710, and/or UE 711, with greater or fewer components depending on the hardware specifications of the particular device or network element. Although information-handling system 1000 represents one example of several types of computing platforms, information-handling system 1000 may include more or fewer elements and/or different arrangements of elements than shown in FIG. 10, and the scope of the claimed subject matter is not limited in these respects.

In one or more embodiments, information-handling system 1000 may comprise one or more applications processor 1010 and a baseband processor 1012. Applications processor 1010 may be utilized as a general purpose processor to run applications and the various subsystems for information handling system 1000. Applications processor 1010 may include a single core or alternatively may include multiple processing cores wherein one or more of the cores may comprise a digital signal processor or digital signal processing core. Furthermore, applications processor 1010 may include a graphics processor or coprocessor disposed on the same chip, or alternatively a graphics processor coupled to applications processor 1010 may comprise a separate, discrete graphics chip. Applications processor 1010 may include on-board memory, such as cache memory, and former may be coupled to external memory devices such as synchronous dynamic random access memory (SDRAM) 1014 for storing and/or executing applications during operation, and NAND flash 1016 for storing applications and/or data even when information handling system 1000 is powered off. Baseband processor 1012 may control the broadband radio functions for information-handling system 1000. Baseband processor 1012 may store code for controlling such broadband radio functions in a NOR flash 1018. Baseband processor 1012 controls a wireless wide area network (WWAN) transceiver 1020 which is used for modulating and/or demodulating broadband network signals, for example for communicating via a 3GPP LTE network or the like as discussed herein with respect to FIG. 7. The WWAN transceiver 1020 couples to one or more power amplifiers 1022 that are respectively coupled to one or more antennas 1024 for sending and receiving radio-frequency signals via the WWAN broadband network. The baseband processor 1012 also may control a wireless local area network (WLAN) transceiver 1026 coupled to one or more suitable antennas 1028 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 1010 and baseband processor 1012, and the scope of the claimed subject matter is not limited in these respects. For example, any one or more of SDRAM 1014, NAND flash 1016 and/or NOR flash 1018 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1010 may drive a display 1030 for displaying various information or data, such as information related to the received signal power from the at least one neighbor cell, and may further receive touch input from a user via a touch screen 1032, for example, via a finger or a stylus. An ambient light sensor 1034 may be utilized to detect an amount of ambient light in which information-handling system 1000 is operating, for example, to control a brightness or a contrast value for display 1030 as a function of the intensity of ambient light detected by ambient light sensor 1034. One or more cameras 1036 may be utilized to capture images that are processed by applications processor 1010 and/or at least temporarily stored in NAND flash 1016. Furthermore, applications processor may couple to a gyroscope 1038, accelerometer 1040, magnetometer 1042, audio coder/decoder (CODEC) 1044, and/or global positioning system (GPS) controller 1046 coupled to an appropriate GPS antenna 1048, for detection of various environmental properties including location, movement, and/or orientation of information handling system 1000. Alternatively, controller 1046 may comprise a Global Navigation Satellite System (GNSS) controller. Audio CODEC 1044 may be coupled to one or more audio ports 1050 to provide microphone input and speaker outputs either via internal devices and/or via external devices coupled to information-handling system via the audio ports 1050, for example via a headphone and microphone jack. In addition, applications processor 1010 may couple to one or more input/output (I/O) transceivers 1052 to couple to one or more I/O ports 1054 such as a universal serial bus (USB) port, a high-definition multimedia interface (HDMI) port, a serial port, and so on. Furthermore, one or more of the I/O transceivers 1052 may couple to one or more memory slots 1056 for optional removable memory, such as secure digital (SD) card or a subscriber identity module (SIM) card, although the scope of the claimed subject matter is not limited in these respects.

Figure 11:
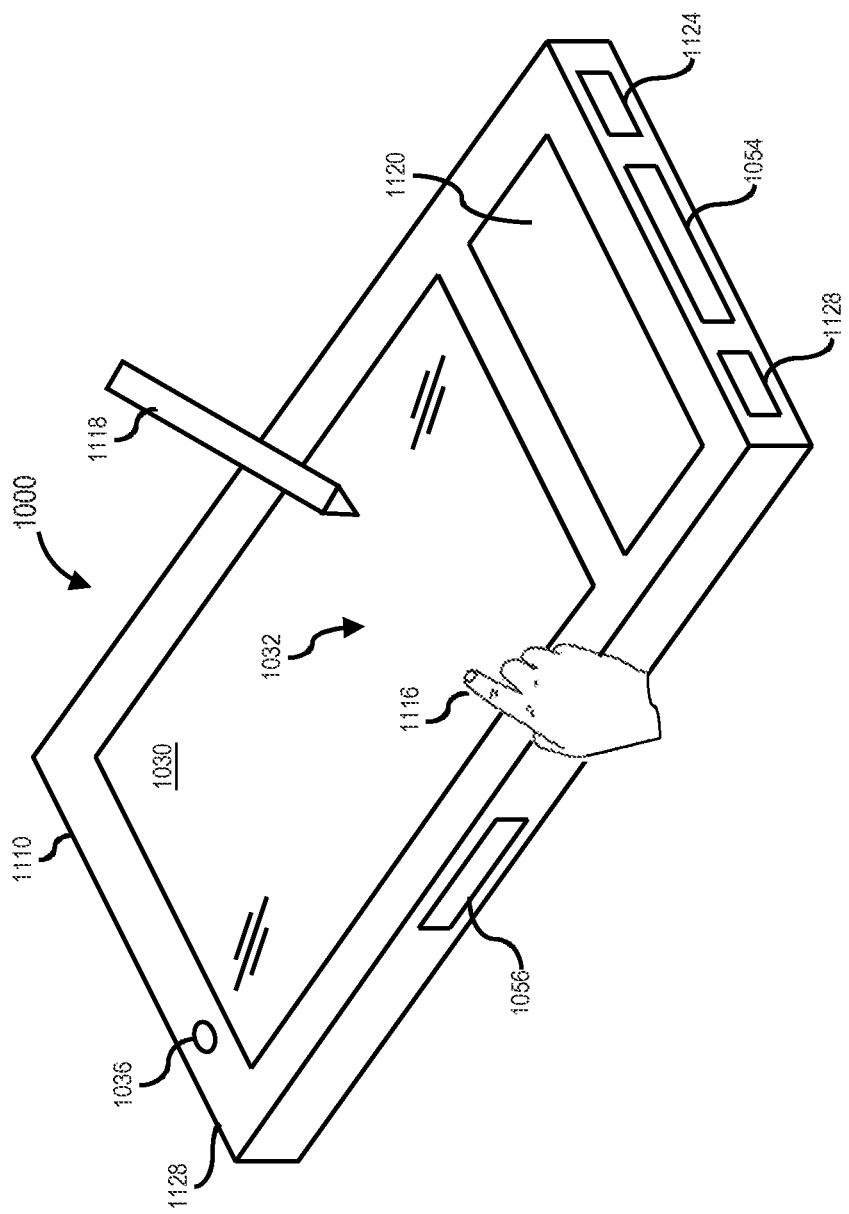
FIG. 11 depicts an isometric view of an exemplary embodiment of the information-handling system of FIG. 10 that optionally may include a touch screen in accordance with one or more embodiments.

FIG. 11 depicts an isometric view of an exemplary embodiment of the information-handling system of FIG. 10 that optionally may include a touch screen in accordance with one or more embodiments. FIG. 11 shows an example implementation of information-handling system 1000 of FIG. 10 tangibly embodied as a cellular telephone, smartphone, or tablet-type device or the like. In one or more embodiments, the information-handling system 1000 may comprise any one of the infrastructure nodes, subscriber station 616, CPE 622 of FIG. 6, mobile station UE 711 of FIG. 7, and/or an M2M-type device, although the scope of the claimed subject matter is not limited in this respect. The information-handling system 1000 may comprise a housing 1110 having a display 1030 that may include a touch screen 1032 for receiving tactile input control and commands via a finger 1116 of a user and/or a via stylus 1118 to control one or more applications processors 1010. In one exemplary embodiment, touch screen 1032 is capable of displaying information related to the received signal power from the at least one neighbor cell, and is capable of being controlled by a stylus, at least one finger, or a combination thereof. The housing 1110 may house one or more components of information-handling system 1000, for example, one or more applications processors 1010, one or more of SDRAM 1014, NAND flash 1016, NOR flash 1018, baseband processor 1012, and/or WAN transceiver 1020. The information-handling system 1000 further may optionally include a physical actuator area 1120 which may comprise a keyboard or buttons for controlling information-handling system via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1124 and a connection port 1054 for connecting the information-handling system 1000 to another electronic device, dock, display, battery charger, and so on. Additionally, information-handling system 1000 may include a headphone or speaker jack 1128 and one or more cameras 1036 on one or more sides of the housing 1110. It should be noted that the information-handling system 1000 of FIGS. 10 and 11 may include more or fewer elements than shown, in various arrangements, and the scope of the claimed subject matter is not limited in this respect.

Figure 12:
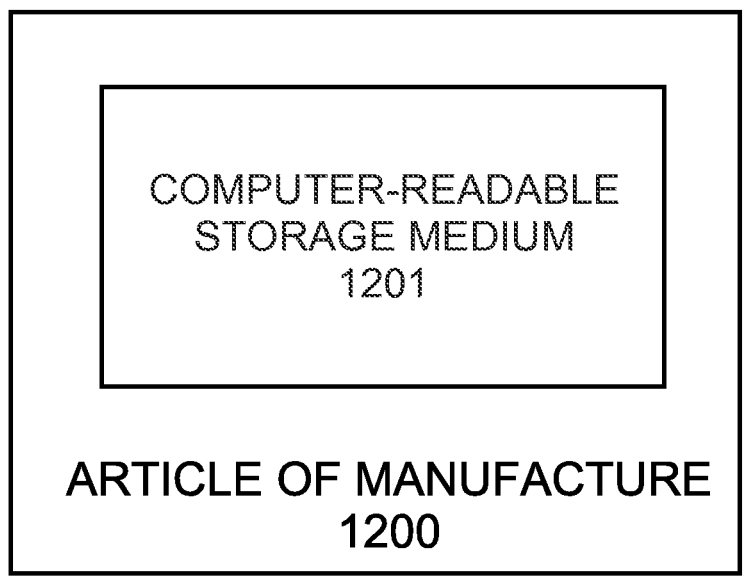
FIG. 12 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 12 depicts an exemplary embodiment of an article of manufacture 1200 comprising a non-transitory computer-readable storage medium 1201 having stored thereon computer-readable instructions that, when executed by a computer-type device, results in any of the various techniques and methods according to the subject matter disclosed herein. Exemplary computer-readable storage mediums that could be used for computer-readable storage medium 1201 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A transceiver device, comprising:
a receiver capable of identifying at least one neighbor cell of a wireless network in which the transceiver device is located, the receiver capable of identifying the at least one neighbor cell by detecting a synchronization signal of the at least one neighbor cell and capable of measuring a received signal power from the at least one neighbor cell; and
transmitter capable of communicating to a network entity of the wireless network identifying information and the received signal power of the at least one neighbor cell, wherein the network entity determines if the transceiver device is isolated from the at least one neighbor cell based at least on the measured received signal power from the at least one neighbor cell,
the receiver being further capable of receiving from the network entity information indicating whether dynamic uplink-downlink reconfiguration can be enabled of the allocation of uplink and downlink subframes used in the cell in which the transceiver is located, wherein dynamic uplink-downlink reconfiguration is enabled if the transceiver device is isolated from the at least one neighbor cell and dynamic uplink-downlink reconfiguration is disabled if the transceiver device is not isolated from the at least one neighbor cell, the information received from the network entity indicating the reconfiguration can be enabled of the allocation of uplink and downlink subframes used in the cell, and
the transceiver device further comprising a processor capable of reconfiguring the allocation of uplink and downlink subframes used in the cell.

2. The transceiver according to claim 1, wherein the receiver is further capable of identifying the at least one neighbor cell by detecting a synchronization signal of the at least one neighbor cell by detecting time and frequency synchronization signals of the at least one neighbor cell.

3. The transceiver according to claim 2, wherein the receiver is further capable of measuring the received signal power from the at least one neighbor cell by measuring a Reference Signal Received Power (RSRP) or a Reference Signal Received Quality (RSRQ), or a combination thereof, of the at least one neighbor cell.

4. The transceiver according to claim 1, wherein the receiver is further capable of measuring the received signal power from the at least one neighbor cell by measuring a Reference Signal Received Power (RSRP) or a Reference Signal Received Quality (RSRQ), or a combination thereof, of the at least one neighbor cell.

5. The transceiver according to claim 1, wherein the transceiver comprises an enhanced node B (eNB).

6. The transceiver according to claim 1, wherein the cell in which the transceiver is located comprises a macrocell, a picocell or a femtocell.

7. The transceiver according to claim 1, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

8. The transceiver according to claim 1, further comprising a touchscreen display capable of displaying information related to the received signal power from the at least one neighbor cell, and capable of being controlled by a stylus, at least one finger, or a combination thereof.

9. A method, comprising:
identifying at a base station of a cell of a wireless network at least one neighbor cell by detecting a synchronization signal of the at least one neighbor cell;
measuring at the base station a received signal power from the at least one neighbor cell;
communicating to a network entity of the wireless network identifying information and the received signal power of the at least one neighbor cell, wherein the network work entity determines if the base station is isolation from the at least one neighbor cell based at least in part on the measured received signal power from the at least one neighbor cell;
receiving from the network entity information indicating whether the base station can enable dynamic uplink-downlink reconfiguration of the allocation of uplink and downlink subframes used in the cell of the base station, wherein dynamic uplink-downlink reconfiguration is enabled of the base station is isolated from the at least one neighbor cell and dynamic uplink-downlink reconfiguration is disabled if the base station is not isolated from the at least one neighbor cell; and
reconfiguring the allocation of uplink and downlink subframes used in the cell of the base station if the information received from the network entity indicates that the base station can enable reconfiguration of the allocation of the uplink and downlink subframes used in the cell of the base station.

10. The method according to claim 9, wherein identifying the at least one neighbor cell by detecting a synchronization signal of the at least one neighbor cell comprising detecting time and frequency synchronization signals of the at least one neighbor cell.

11. The method according to claim 10, wherein measuring the received signal power from the at least one neighbor cell comprises measuring a Reference Signal Received Power (RSRP) or a Reference Signal Received Quality (RSRQ), or a combination thereof, of the at least one neighbor cell.

12. The method according to claim 9, wherein measuring the received signal power from the at least one neighbor cell comprises measuring a Reference Signal Received Power (RSRP) or a Reference Signal Received Quality (RSRQ), or a combination thereof, of the at least one neighbor cell.

13. The method according to claim 9, wherein the base station comprises an enhanced node B (eNB).

14. The method according to claim 9, wherein the cell of the base station comprises a macrocell, a picocell or a femtocell.

15. The method according to claim 9, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

16. The method according to claim 9, wherein the base station comprises a touchscreen display capable of displaying information related to the received signal power from the at least one neighbor cell, and capable of being controlled by a stylus, at least one finger, or a combination thereof.

17. The method according to claim 9, further comprising:
receiving at the network entity the identifying information and the received signal power of the at least one neighbor cell of the base station; and
determining whether the base station can enable a reconfiguration of the allocation of uplink and downlink subframes used in the cell of the base station; and
communicating to the base station the information indicating whether the base station can enable a reconfiguration of the allocation of uplink and downlink subframes used in the cell of the base station.

18. The method according to claim 17, wherein determining whether the base station can enable a reconfiguration of the allocation of uplink and downlink subframes used in the cell of the base station comprises determining that the base station can enable a reconfiguration of the allocation of uplink and downlink subframes used in the cell of the base station if the received signal power of the at least one neighbor cell is less than or equal to a predetermined threshold and if the received signal power of the base station at the neighbor cell is less than or equal to the predetermined threshold.

19. The method according to claim 18, further comprising communicating to the at least one neighbor cell information indicating that the at least one neighbor cell can enable a reconfiguration of the allocation of uplink and downlink subframes used in the at least one neighbor cell if it is determined that the base station can enable a reconfiguration of the allocation of uplink and downlink subframes used in the cell of the base station.

20. An article comprising: a non-transitory computer-readable medium having stored thereon instructions that, if executed, result in at least the following:
detecting at a base station of a cell of a wireless network a synchronization signal of at least one neighbor cell;
identifying at the base station the at least one neighbor cell based on the detected synchronization signal of the at least one neighbor cell;
measuring at the base station a Reference Signal Received Power (RSRP) or a Reference Signal Received Quality (RSRQ), or a combination thereof, of the at least one neighbor cell;
communicating to a network entity of the wireless network identifying information and the RSRP or RSRQ, or a combination thereof, of the at least one neighbor cell, wherein the network entity determines if the base station is isolated from the at least one neighbor cell based at least in part on the RSRP or RSRQ or a combination thereof;
receiving from the network entity information indicating whether the base station can enable dynamic uplink-downlink reconfiguration of the allocation of uplink and downlink subframes used in the cell of the base station, wherein dynamic uplink-downlink reconfiguration is enabled if the base station is isolated from the at least one neighbor cell and dynamic uplink-downlink reconfiguration is disabled if the base station is not isolated from the at least one neighbor cell; and
reconfiguring the allocation of uplink and downlink subframes used in the cell of the base station if the information received from the network entity indicates that the base station can enable reconfiguration of the allocation of the uplink and downlink subframes used in the cell of the base station.

21. The article according to claim 20, wherein identifying the at least one neighbor cell is further based on detecting time and frequency synchronization signals of the at least one neighbor cell.

22. The article according to claim 20, wherein the base station comprises an enhanced node B (eNB).

23. The article according to claim 20, wherein the cell of the base station comprises a macrocell, a picocell or a femtocell.

24. The article according to claim 20, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

25. The article according to claim 20, wherein the base station comprises a touchscreen display capable of displaying information related to the received signal power from the at least one neighbor cell, and capable of being controlled by a stylus, at least one finger, or a combination thereof.

* * * * *